W. J. WILSON.
BRAKE.
APPLICATION FILED MAY 23, 1916.

1,236,243.

Patented Aug. 7, 1917.
2 SHEETS—SHEET 1.

Inventor:
William J. Wilson
By Vernon E. Hodges
his Atty.

W. J. WILSON.
BRAKE.
APPLICATION FILED MAY 23, 1916.
1,236,243.
Patented Aug. 7, 1917.
2 SHEETS—SHEET 2.
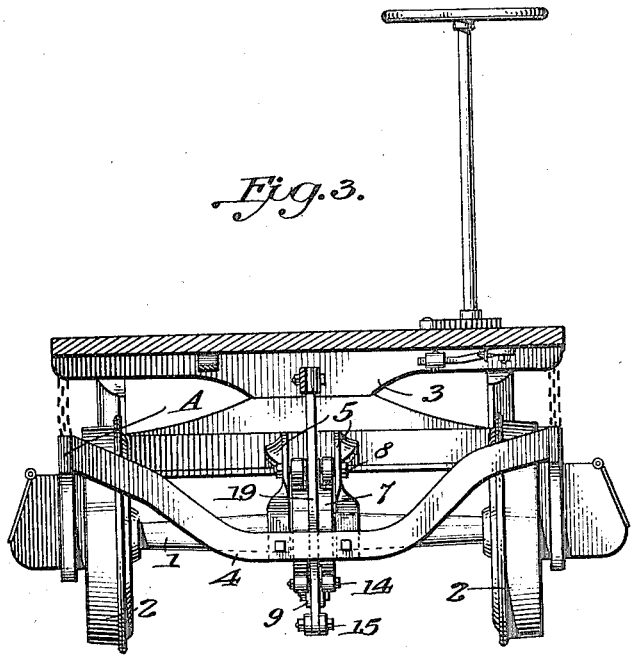
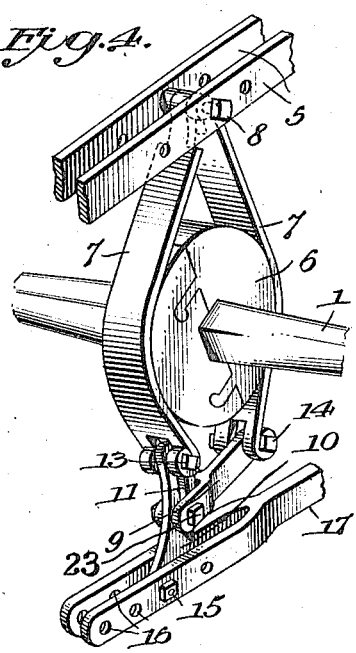
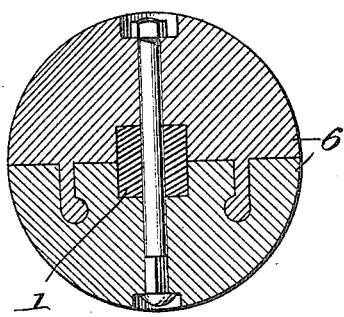
Inventor:
William J. Wilson
By Vernon E. Hodges
his Atty

UNITED STATES PATENT OFFICE.

WILLIAM J. WILSON, OF WASHINGTON, DISTRICT OF COLUMBIA.

BRAKE.

1,236,243. Specification of Letters Patent. Patented Aug. 7, 1917.

Application filed May 23, 1916. Serial No. 99,386.

*To all whom it may concern:*

Be it known that I, WILLIAM J. WILSON, a citizen of the United States, residing at Washington, in the District of Columbia, have invented certain new and useful Improvements in Brakes, of which the following is a specification.

My invention relates to an improvement in brakes, it being applicable to any form of vehicle such as railway cars more particularly, or automobiles, and the like.

The object primarily is to provide improved mechanism for applying the brake to the axle at a point between the wheels, preferably, instead of directly to any part of the wheel, as for instance the tread, which application of the brake while customary and time-honored, is, nevertheless, objectionable for various reasons—the unnecessary and excessive wear, the causing or accentuating of flat wheels, and on account of the brake-shoes sometimes dropping in front of a wheel and resulting in derailment or other accident.

My present invention consists in a hub or drum applied to the axle at some point and preferably midway between the wheels, in connection with brake-shoes pivotally suspended at a point more or less directly above the hub or drum, and connected together at their lower ends by means of a folding lever and toggle mechanism, with a connection across from axle to axle, and lever and rod connection to the brake actuating mechanism, all of which is so disposed and connected that a hub or drum can be removed or replaced without jacking up or lifting the truck or car, and with the least possible trouble, delay, and inconvenience.

My invention further consists in certain details of construction and combinations of parts which will be hereinafter described and pointed out in the claims.

In the accompanying drawings:

Fig. 3 is a transverse section; and

Figs. 4 and 5 are details.

Figure 1:
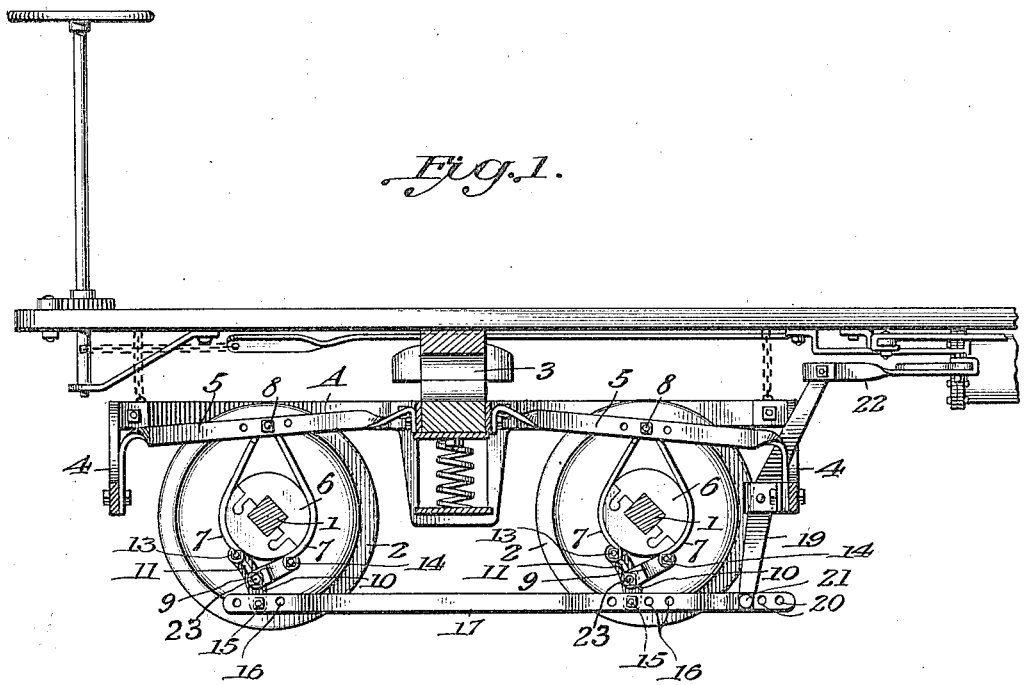
Figure 1 is a view in side elevation with parts broken away.
Figure 2:
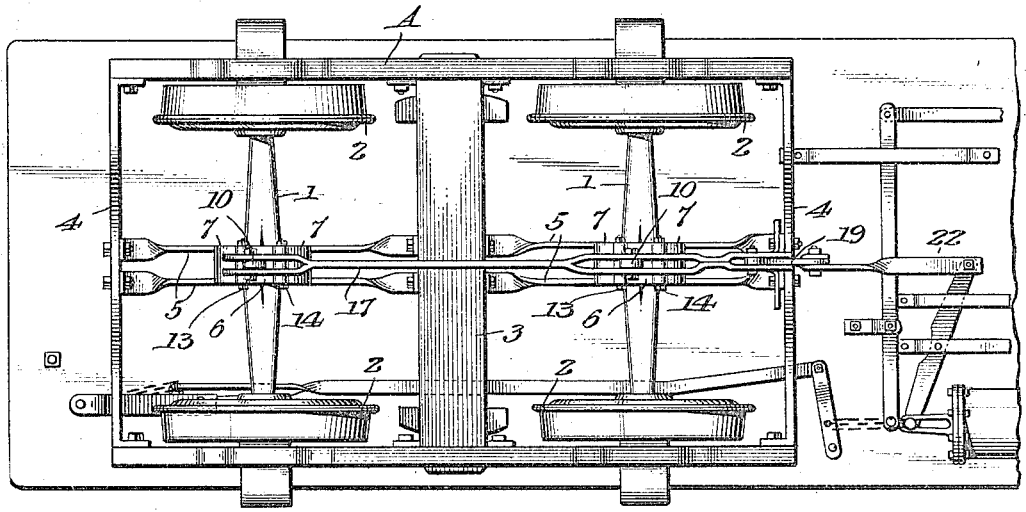
Fig. 2 is a bottom plan view.

The drawings show the application of my brake to a railway car-truck, and the axles thereof, although it is understood that I contemplate using it in connection with automobiles or in fact other forms of vehicles.

A, represents a railway-truck of ordinary type, and 1, 1, are the axles, and 2, 2, the wheels, 3 being the usual central bolster.

Yokes 4, 4, are bolted across the ends of the truck, and from these truss-rods 5, 5, extend in pairs to the opposite sides of the center of the bolster, forming a means for the support of the brake-bands.

A hub or drum 6 may be made integral, or preferably is made in interlocking sections and applied to and bolted at the center of each axle, as shown.

Brake-bands 7, 7, are pivotally attached at a point above each axle in pairs by means of bolts or pins 8, 8, extending across from one truss-rod to the other, and these brake-bands embrace and are adapted to engage the hubs or drums with equal pressure from opposite sides. The application of these brake-bands to the hubs or drums may be effected in any approved manner, and as a simple means I propose the toggle-joints shown, which consist each of a link 9 pivoted to one brake-band at 14, and a lever 10 pivoted to the other brake-band at 13, said lever having en elongated slot 11, whereby and through which a bolt 23 pivotally connects the link and lever together.

These folding levers in turn are pivotally connected by bolts 15, through the holes 16, 16 in the connecting-bar 17, a number of holes being provided, as shown, as a means of obtaining suitable adjustment.

To this connecting-bar a rocking-lever 19 is connected, there being several holes 20 in the bar 17 to receive the bolt 21 for making the connection at the desired point on the connecting-bar. The inner or upper end of this rocking lever is connected by link and lever mechanism 22 to the brake-cylinder. In this way, a simple mechanism easily applied to the present form of railway truck and car-axle is provided, and one which makes it simple and easy to repair the brake, or to remove old parts, or to apply new parts without disturbing the position of the rolling-stock in the least, by simply taking out two of the bolts or pins.

More or less slight changes might be made in the form and arrangement of the several parts described without departing from the spirit and scope of my invention, and hence I do not wish to be limited to the exact construction herein set forth, but:

I claim:

1. A brake mechanism comprising axles, a hub or drum adapted to be applied to each axle, brake-bands pivotally suspended at a point adjacent to each hub or drum, a toggle mechanism connecting their opposite ends, a connecting bar extending from one toggle mechanism to the other, and means extending from the brake mechanism to said connecting bar.

2. The combination with a sectional interlocking hub or drum, of brake-shoes, means for pivotally supporting the latter, toggles connecting one end thereof, said toggles comprising a link and slotted lever, and means for operating said lever to apply and release the grip of the brake-shoes upon the hub or drum.

3. The combination with axles and a hub or drum secured to each axle, of brake-shoes pivotally supported at a point adjacent to each hub or drum, and extending on opposite sides thereof, toggles connecting the ends of the brake-shoes opposite the pivot, and a connecting rod to which said toggles are adjustably connected as a means for operating the brake-shoes simultaneously.

4. The combination of a truck, axle and wheels, yokes extending across the ends of the truck, truss-rods extending from the yokes to the central bolster of the truck, hubs or drums secured to the axles, brake-shoes pivotally connected to the truss-rods, toggles connecting the opposite ends of the brake-shoes, and means connecting the toggles for applying or releasing the brakes to two axles simultaneously.

In testimony whereof I affix my signature.

WILLIAM J. WILSON.

Witnesses:
C. S. HERITAGE,
R. ROLLINS.

Copies of this patent may be obtained for five cents each, by addressing the "Commissioner of Patents, Washington, D. C."